United States Patent [19]

Campbell et al.

[11] Patent Number: 5,012,901
[45] Date of Patent: May 7, 1991

[54] SELF-ENERGIZING DISC BRAKES

[75] Inventors: Roy Campbell, Worcestershire, England; Anthony G. Price, Gwent, Wales

[73] Assignee: Lucas Industries public limited company, Birmingham, United Kingdom

[21] Appl. No.: 411,708

[22] Filed: Sep. 25, 1989

[30] Foreign Application Priority Data

Sep. 28, 1988 [GB] United Kingdom ............. 8822764

[51] Int. Cl.⁵ ............................................ F16D 55/04
[52] U.S. Cl. ............................. 188/71.4; 188/264 E; 188/72.2
[58] Field of Search ............... 188/71.3, 71.4, 72.2, 188/264 E, 71.5

[56] References Cited

U.S. PATENT DOCUMENTS

| 2,256,725 | 9/1941 | Pierce et al. | 188/71.4 |
| 2,633,943 | 4/1953 | Lambert | 188/71.3 |
| 2,799,366 | 7/1957 | Zindler | 188/71.3 |
| 3,094,194 | 6/1963 | Kershner | 188/264 E X |
| 3,203,507 | 8/1965 | Bond | 188/71.4 |
| 4,862,998 | 9/1989 | Campbell et al. | 188/71.4 X |

FOREIGN PATENT DOCUMENTS

1005382 9/1965 United Kingdom ............... 188/72.2

Primary Examiner—Douglas C. Butler
Assistant Examiner—Peter M. Poon
Attorney, Agent, or Firm—Oldham & Oldham Co.

[57] ABSTRACT

A compound disc brake comprises a pair of pressure plates with a ball and ramp camming mechanism, one of the plates comprises a driven plate keyed to a rotating axle shaft to be braked, and the other plate comprises an input plate carried from the driven plate by the camming mechanism. The input plate is of larger diameter than the driven plate with its radially outer region comprising a torque-transmitting mechanism which transmits torque applied to that region by primary braking device, which can be a spot brake, to the central region of the input plate. Retardation of the input plate by the primary braking device causes the pressure plates to separate axially and move into engagement with relatively stationary braking surfaces in a brake housing whereafter servo braking occurs. Various multi-plate embodiments are disclosed, including embodiments in which the torque-transmitting mechanism is a separate annular disc keyed to the outer peripheral edge of the servo plate. Other modifications of the pressure plates are also disclosed.

16 Claims, 5 Drawing Sheets

SELF-ENERGIZING DISC BRAKES

This invention relates to self-energising disc brake assemblies of the compound kind in which a pair of pressure plates is located between axially spaced braking surfaces provided in a housing, self-energising camming means is provided between the plates and comprises balls or rollers located in co-operating oppositely inclined angularly spaced recesses provided in adjacent faces of the pressure plates, relative angular movement between the plates causing the plates to move axially apart and into engagement with the braking surfaces due to the balls or rollers riding up ramps defined by the edges of the recesses, and in which one of the plates comprises a driven plate coupled to a rotatable shaft of the brake assembly so as to be axially movable with respect to the shaft but angularly immovable relative thereto, and the other plate comprises an input plate carried from the driven plate by means of the camming means, the compound brake comprising primary braking means provided in the housing to retard rotation of the input plate and a secondary brake formed by the self-energising engagement of the pressure plates with the braking surfaces, actuation of the secondary brake being effected by application of the primary braking means to retard the input plate and so cause relative angular movement between the pressure plates causing them to engage the braking surfaces whereby to initiate a self-energising braking action by the secondary brake. Such brake assemblies will hereinafter be referred to as being "of the kind set forth".

An example of a brake assembly of the kind set forth is shown in U.S. Pat. No. 3,403,753 which discloses such a brake having a servo plate with an axial flange at its outer periphery, and a primary braking means comprising a band brake for application to the axial flange.

Brakes such as that shown in U.S. Pat No. 3,403,753 either need complicated actuation mechanisms for their bands, or have to tolerate scuffing and wear of the band as a result of movement of the axial flange in an axial direction during brake actuation. They are also characterised by their instability, having a high servo factor band brake in series with a high factor ball and ramp brake.

According to the invention in a brake assembly of the kind set forth torque-transmitting means co-operates with the input plate and is angularly rigid with respect to the input plate, the torque-transmitting means extending radially outwards beyond the outer peripheral edge of the driven plate and having a radial friction surface beyond that edge, said primary braking means being adapted to apply a force to the radial friction surface of the torque-transmitting means substantially in an axial direction in order to retard the input plate.

Conveniently the primary braking means co-operates with the radial friction surface to constitute a disc brake.

Providing a disc brake is far more stable than using a band brake, and provides a more compact assembly.

By applying an axial force to the torque-transmitting means problems associated with radial stresses during brake actuation are eliminated.

A further advantageous feature of the invention is that no wear adjuster is necessary to allow for changes in geometry during the wear life of the brake assembly.

The torque-transmitting means may comprise an integral part of the input plate and the input plate may simply be of larger diameter than the driven plate.

Alternatively, the torque transmitting means may comprise a member secured to the input plate. In such an embodiment the torque-transmitting member may comprise one or more annular rings keyed to the outer peripheral edge of the input plate for axial movement relative thereto. Each ring preferably has a lining of friction material.

When the torque-transmitting means comprises two or more annular rings keyed to the input plate the primary braking means preferably includes one or more stationary members interposed between adjacent rings and against which the rings may be urged to brake the input plate.

Preferably the primary braking means is of a non-servo nature. This improves the 'feel' characteristics of the brake assembly as a whole, as compared to that experienced with a servo primary braking means. A brake assembly with non-servo primary braking means is also less sensitive to changes in the co-efficient of friction of its braking surfaces than an assembly with servo primary braking means.

The primary braking means may comprise a 'spot' type actuator, akin to a spot caliper. Preferably, however, the primary braking means comprises an annular piston. The brake assembly is then of circular form and there are no asymmetric input loads on the axle shaft. The brake assembly is also then of a particularly compact form.

In a preferred embodiment the primary braking means comprises an annular piston working in a complementary bore in the housing and defining a pressure space in combination with the bore, hydraulic fluid being fed to the pressure space through a supply passage, and the bore and supply passage being defined in a spacer unit which is bolted to the housing.

The spacer unit preferably has a radial flange which is clamped against the housing. The supply passage may be a radially extending passage in the radial flange. Preferably the spacer unit defines a braking surface. The spacer unit may be clamped between the axle housing and a transmission casing of a vehicle.

Preferably the brake assembly includes a parking brake. The parking brake may act on the driven plate or on the input plate and may comprise a belt brake, spot brake, or drum brake. A servo brake may be used as the parking brake.

The pressure plates preferably have linings of friction material for engagement with the braking surfaces. The linings of the pressure plates may be secured to the plates themselves or preferably they are provided on separate discs which are keyed to the pressure plates.

The secondary brake may include one or more friction discs which are keyed to the shaft and are provided with friction linings interposed between the pressure plates and the braking surfaces on the housing, and stationary plates interposed between the pressure plates and the friction discs, and between adjacent friction discs, the stationary plates defining further braking surfaces.

When the brake assembly is "oil-immersed" the pressure plates may have a pocket, or angularly spaced pockets, adapted to be immersed in a bath of oil and adapted to pick up oil. Slots or grooves may be provided in the friction linings associated with the pressure plates to encourage the flow of oil. The pockets may deliver oil to the slots or grooves. The pockets may be formed in the adjacent surfaces of the pressure plates and may be cast integrally with the plates.

Embodiments of the invention will now be described by way of example only, with reference to the accompanying drawings of which.

Figure 1:
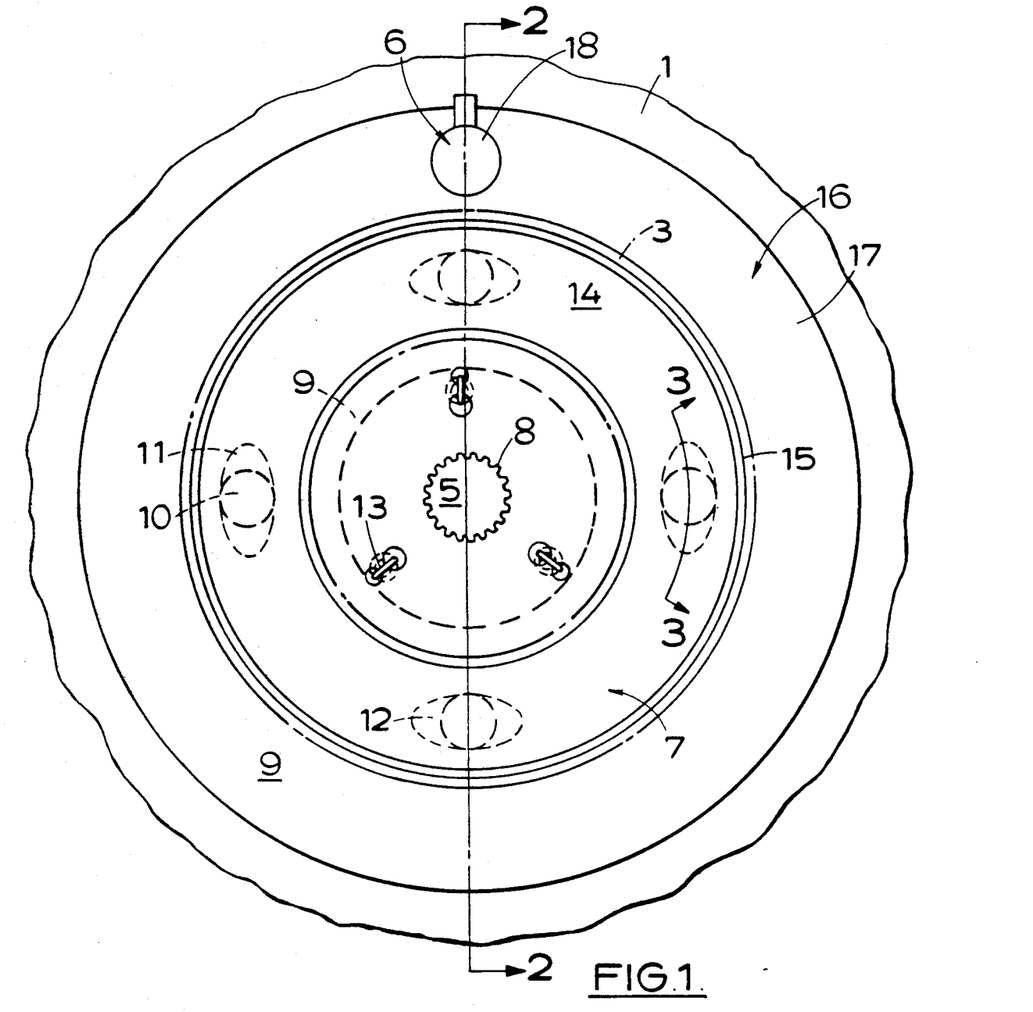
FIG. 1 shows a disc brake in accordance with the invention, with part of its housing removed for clarity.
Figure 2:
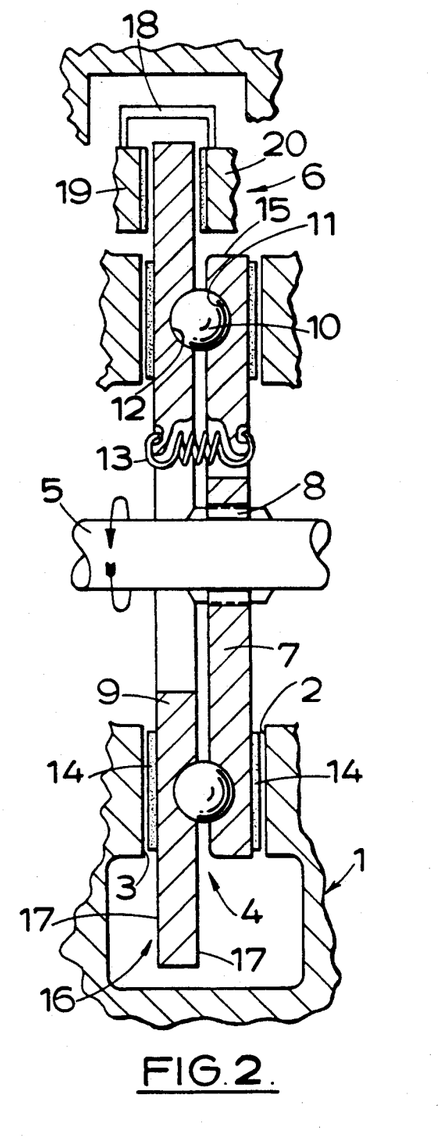
FIG. 2 is a cross-section on line 2—2 of FIG. 1.
Figure 3:
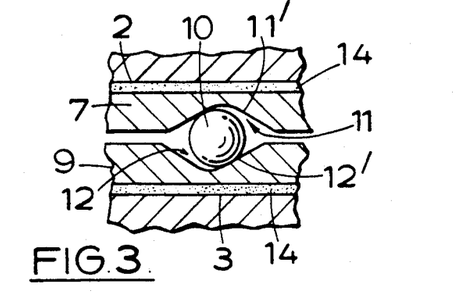
FIG. 3 shows a cross-section on arc 3—3 of FIG. 1 when the brake assembly is actuated.

The brake illustrated in FIGS. 1 to 3 of the drawings is a rather basic simplified brake which is presented to illustrate the invention clearly. The brake comprises a housing 1 having opposed annular radial braking surfaces 2 and 3, a pressure plate assembly 4 located between the braking surfaces and adapted to brake a rotatable axle shaft 5, and primary braking means 6 to initiate actuation of the brake.

The pressure plate assembly 4 comprises a driven servo plate 7, which is keyed to the axle shaft 5 through splines 8, an input plate 9 carried from the driven plate 7 through a series of balls 10 which are received in pairs of co-operating angularly spaced recesses 11 and 12 provided in the adjacent faces of the pressure plates. The recesses 11 and 12 have ramps 11', 12' arranged to provide a self-energising action, in a known manner, for both directions of rotation of the shaft 5. Brake release tension return springs 13 are provided to urge the pressure plates towards each other. Each of the pressure plates 7,9 carries an annular lining of friction material 14 for engagement with its respective braking surface 2 or 3.

The pressure plates comprise a secondary brake of which application is initiated automatically when the primary braking means is actuated.

The input plate 9 is of significantly larger diameter than the driven plate 7 and an annular portion terminating at its outer most peripheral edge projects radially beyond the outer peripheral edge 15 of the driven plate. The said annular portion of the input plate 9 comprises torque-transmitting means 16 by which a retarding torque is transmitted to the central part of the input plate 9 in which the recesses 12 are provided. The torque-transmitting means 16 defines radial friction surfaces 17 on opposite sides of the plate 9.

The primary braking means 6 is only shown schematically, but comprises a non-servo spot type hydraulic brake actuator 18 having a piston 19, and a reaction surface 20 towards which the piston 19 is adapted to be urged. Mechanical means for actuating the primary braking means may also be provided. The piston 19 and reaction surface 20 are axially spaced on opposite sides of the torque-transmitting means 16.

To initiate brake actuation the primary braking means 6 is actuated to urge the piston 19 and reaction surface 20 against the radial friction surfaces 17 of the torque-transmitting means 16. This retards rotation of the input plate 9. However since the driven plate 7 is carried around with the shaft 5, the resulting relative angular movement between the pressure plates causes the balls 10 to ride up the ramps 11', 12', urging the input plate and the driven plate axially away from each other. The linings 14 are therefore urged against the braking surfaces 2 and 3. This tends further to retard the input plate, with the result that the balls are urged even further up the ramps in a self-energising action.

The shaft 5 can only be braked by braking the driven plate 7, since the input plate 9 does not touch the shaft. The driven plate 7 is braked in two ways: firstly by the torque transmitted to that plate from the input plate through the engagement of the balls 10 with the recesses 11, and secondly by the engagement of the friction lining 14 of the driven plate with the braking surface 2. Thus the driven plate 7 is braked both directly by the secondary brake through the engagement of the driven plate 7 with the braking surface 2, and indirectly through the braking of the input plate 9. The input plate 9 is of course braked by the braking surface 3 (secondary brake) and by the primary braking means 6 (primary brake).

The compound brake of FIGS. 1 to 3 retains reasonably stable "feel" characteristics of a non-servo brake o some extent, but also has the greater stopping power of a servo brake. The PV input is that necessary to generate the required torque of the primary braking means alone. (PV is the product of pressure and volume.)

Figure 4:
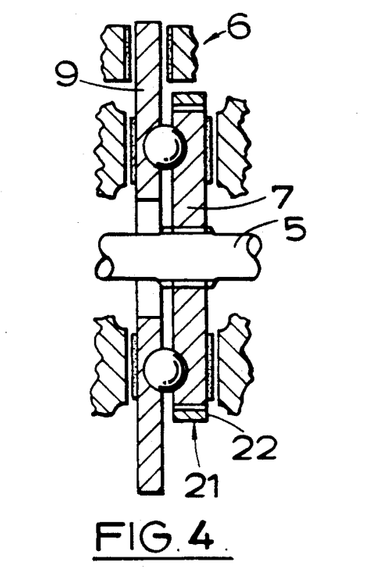
FIG. 4 is a section similar to FIG. 2 but illustrating another brake.
Figure 5:
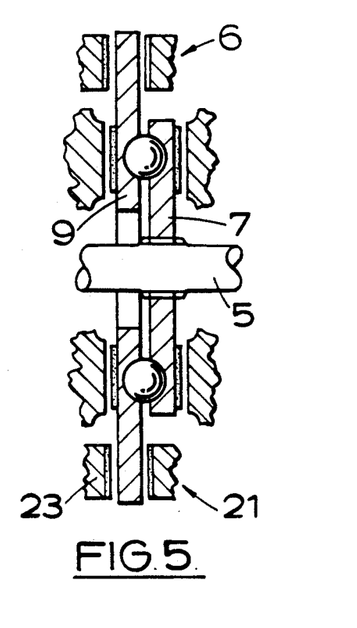
FIG. 5 is a section similar to FIG. 4 but showing a modified brake.

FIGS. 4 and 5 illustrate schematically modified brakes similar to that of FIG. 1 to 3, but having a parking brake 21 in addition to the primary braking means 6. Similar reference numerals have been used where appropriate to identify common parts.

The parking brake 21 of FIG. 4 is constituted by a shoe brake 22 which acts directly on the driven plate 7. However, in a modification, it could be a band brake. The shoe brake 22 is arranged to be self-energising for both directions of rotation of the shaft 5. This, therefore, reduces the required PV for parking.

The parking brake of FIG. 5 is a spot type brake 23 applied to the input plate 9. The servo mechanism of the secondary brake applies the secondary brake should the shaft 5 begin to turn after the parking brake 23 has been applied.

In another modification the primary braking means 6 and the parking brake could be one and the same brake.

In the embodiments described the braking torque produced by the secondary brake is substantially proportional to the braking torque applied by the primary braking means. The braking torque of the secondary brake of FIGS. 1 to 5 is therefore significantly greater than the braking torque of the primary braking means.

Figure 6:
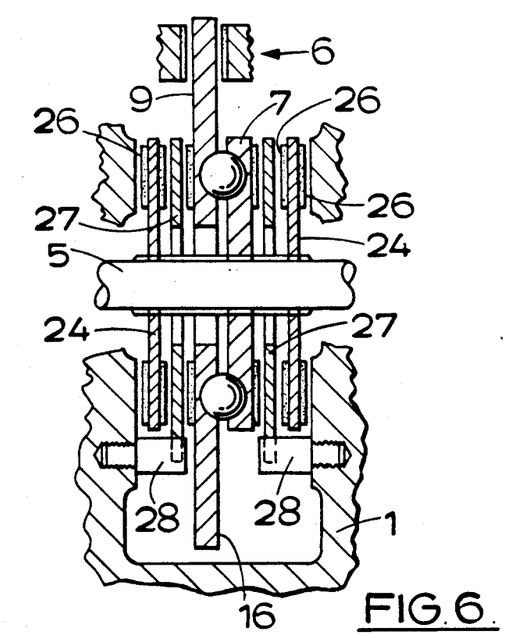
FIG. 6 is a section through yet another brake.

FIG. 6 shows a modified brake in which the braking torque of the secondary brake is increased in comparison with that of the primary braking means. In addition to the structure of the brake of FIGS. 1 to 3, the brake of FIG. 6 has a pair of friction discs 24 keyed to the axle shaft 5 and interposed between the pressure plates and their respective braking surfaces 2 and 3. The friction discs 24 carry friction linings 26 on their radial surfaces. Relatively stationary intermediate plates 27 in the form of annular discs are provided interposed between the friction discs 24 and the pressure plates 7 and 9. The stationary plates 27 are keyed to the housing 1 for axial movement by their co-operation with bolts, lugs or pins 28 fixedly screwed into the housing 1.

The performance of brakes similar to that of FIG. 5 can therefore be increased as shown in FIG. 6 by providing further friction discs 24 (and stationary plates 27). The torque generated by the secondary brake varies substantially in proportion with the number of friction discs 24 that the brake has, while the input PV applied by the operator remains that required to actuate the primary braking means 6. Thus a brake can be produced with an exceptionally high performance.

Figure 7:
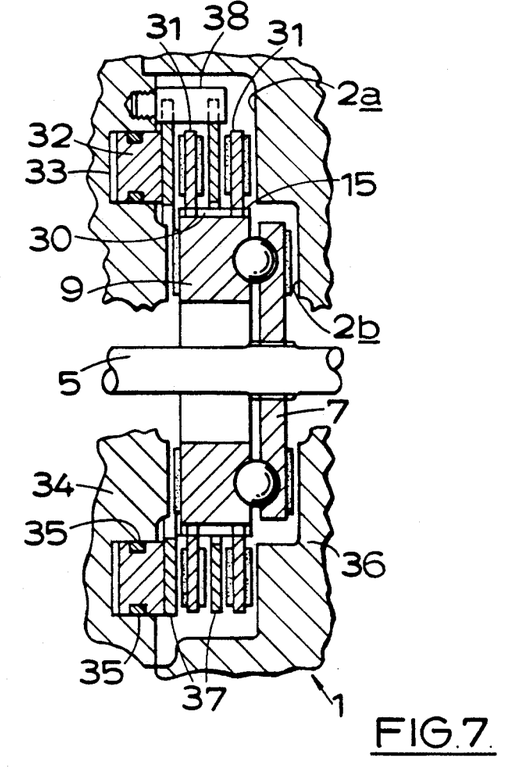
FIG. 7 is a section through a brake in which the primary braking means includes an annular hydraulic piston.

FIG. 7 shows another embodiment of the invention. In this construction the input plate 9 is thicker than that of the input plates in the previous embodiments and has a series of splines 30 provided around its outer peripheral edge 15. A pair of annular torque-transmitting discs 31 having corresponding splines at their inner peripheral edges are provided surrounding the input plate 9, and the discs 31 are keyed to the outer peripheral edge 15 of the input plate 9 for axial movement only. The torque-transmitting discs 31 correspond to the torque-transmitting means 16 of the previous embodiments.

The primary braking means comprises a hydraulically actuated annular piston 32 received in an annular bore 33 provided in a first part 34 of the housing 1 with seals 35 carried by the piston 32 sealing the piston in the bore 33. A second part 36 of the housing is secured to the first part 34 and has a stepped cavity to define the braking surface 2. The braking surface 2 is stepped being defined by a radially outer part 2a against which the adjacent disc 31 reacts, and a radially inner part 2b against which the driven plate 7 reacts. The radially outer part 2a of the braking surface is approximately aligned with the plane of the center of the balls 10 when the brake is unactuated.

An annular relatively stationary intermediate plate 37 is provided interposed between the annular piston 32 and the adjacent torque-transmitting discs 31, and another is provided between the discs 31. The stationary plates 37 are keyed for axial movement by their engagement with screw bolts or pins 38 (only one of which is shown) which are screwed into the first part 34 of the housing 1.

The arrangement of FIG. 7 has a greater surface area of contact between its torque-transmitting means that does the arrangement of FIG. 1, and has a greater energy capacity. The embodiment of FIG. 7 has a relatively greater proportion of its overall braking torque contributed by the non-servo primary braking means than does the brake of FIG. 1 and can therefore be expected to have better 'feel' characteristics than the brake of FIG. 1. The feature of the annular piston 32 gives the brake substantial circular symmetry and reduces radial braking stresses.

Existing brakes which have annular pistons can readily be modified to define compound brakes, similar to that illustrated in FIG. 7, by the addition of a secondary brake similar to those described above. The manufacturing process can also be modified relatively easily.

Figure 8:
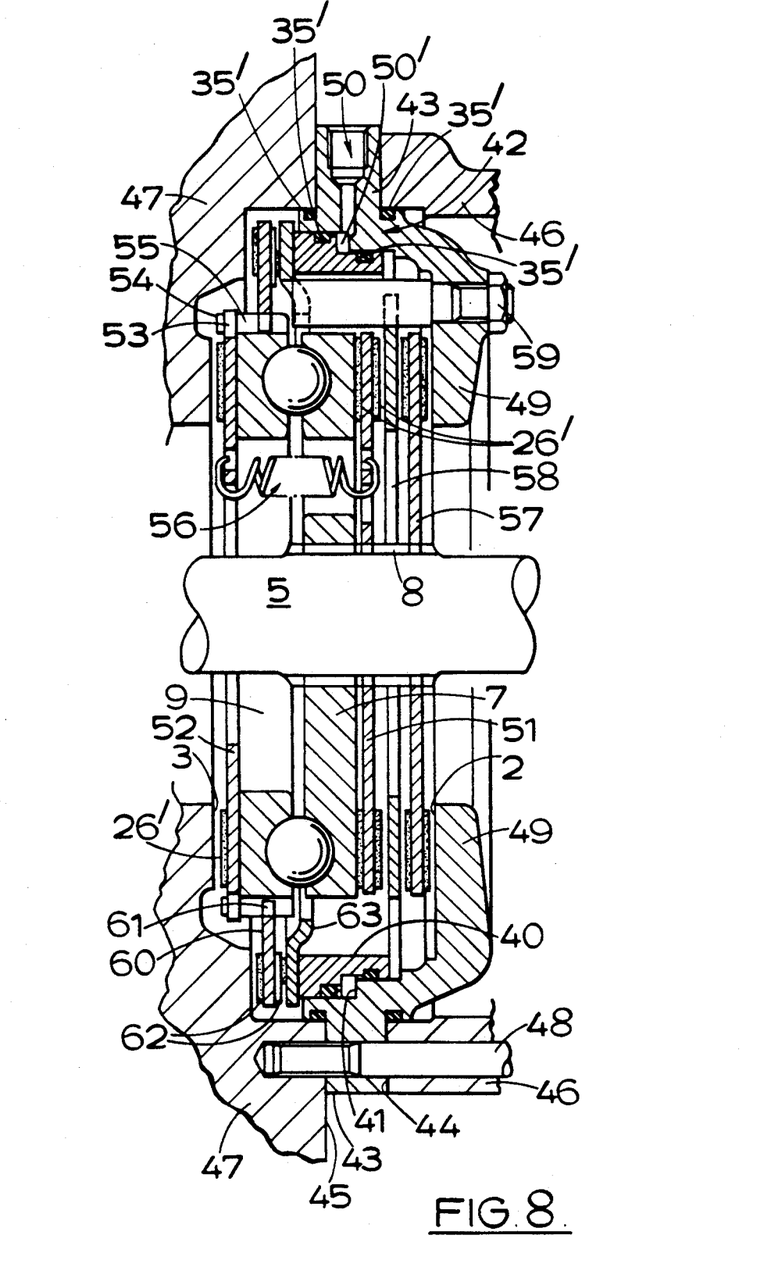
FIG. 8 is a section through a brake based on a combination of the brakes illustrated in FIGS. 6 and 7.

FIG. 8 shows another embodiment of the invention which is in some ways a combination of features present in FIGS. 6 and 7, together with further features. The brake has primary braking means comprising an annular piston 40 of stepped form which is received in a correspondingly stepped bore 41 provided in a spacer unit 42. The spacer unit 42 has a radially projecting peripheral flange 43 which is clamped between complementary abutment surfaces 44 and 45 of an axle housing 46 and a transmission casing 47. Bolts 48 extend from the axle housing, through the flange 43 and into the transmission casing to secure the spacer unit 42. Seals 35' are provided to seal the piston 40, and to seal the junction of the spacer unit 42 and the axle housing 46 and transmission casing 47. The spacer unit 42 has a radially inwardly directed flange 49 which defines the braking surface 2. A supply port 50 extends radially through the flange 43 from a pressure space 50' defined between the piston and the spacer unit.

The pressure plates 7 and 9 do not have integral friction linings. Instead it is more convenient to key lining discs 51 and 52 (similar to the friction discs 24 of FIG. 6) to the pressure plates 7 and 9 respectively. The lining discs 51 and 52 have friction linings 26'. The lining disc 52 is keyed to the input plate 9 at its outer periphery by the co-operation of radially projecting fingers 53 at the outer edge of the lining disc 52 with axial projections 54 of splines 55 provided at the outer peripheral edge of the input plate 9. The lining disc 51 is keyed to the driven plate 7 by being keyed to the axle shaft 5 by means of the splines 8. The lining disc 51 has a redundant lining 26'. Brake release tension return springs 56 act between the lining discs 51 and 52.

An additional friction disc 57 keyed to the axle shaft 5 is provided between the lining disc 51 and the braking surface 2. A relatively stationary plate 58 is interposed between discs 51 and 57 and is keyed against rotation by its engagement with bolts 59 mounted in flange 49.

The torque-transmitting means 6 of the brake of FIG. 8 comprises an annular torque-transmitting disc 60 which is keyed to the outer peripheral edge of the servo plate by inwardly directed splines 61 which co-operate with the splines 55 of the input plate 9. The torque-transmitting disc 60 has friction linings 62. An annular torque-taking plate 63 is interposed between the torque-transmitting disc 60 and the annular piston 40. The plate 63 is axially cranked at its radially inner portion and is keyed against rotation by its engagement with bolts 59. The torque-taking plate 63 prevents the annular piston 40 from receiving torque from the driven plate 7.

The operation of the brake of FIG. 8 is similar to that of FIGS. 6 and 7.

The provision of the bore 41 in a separate spacer unit 42 instead of directly into the housing 1 enables the bore 41 to be machined into a low-cost component. Any flaws in the difficult operation of machining the bore do not ruin the entire housing, but only the relatively cheap spacer unit. In addition the spacer unit 42 can be used with a variety of different brake models.

Figure 9:
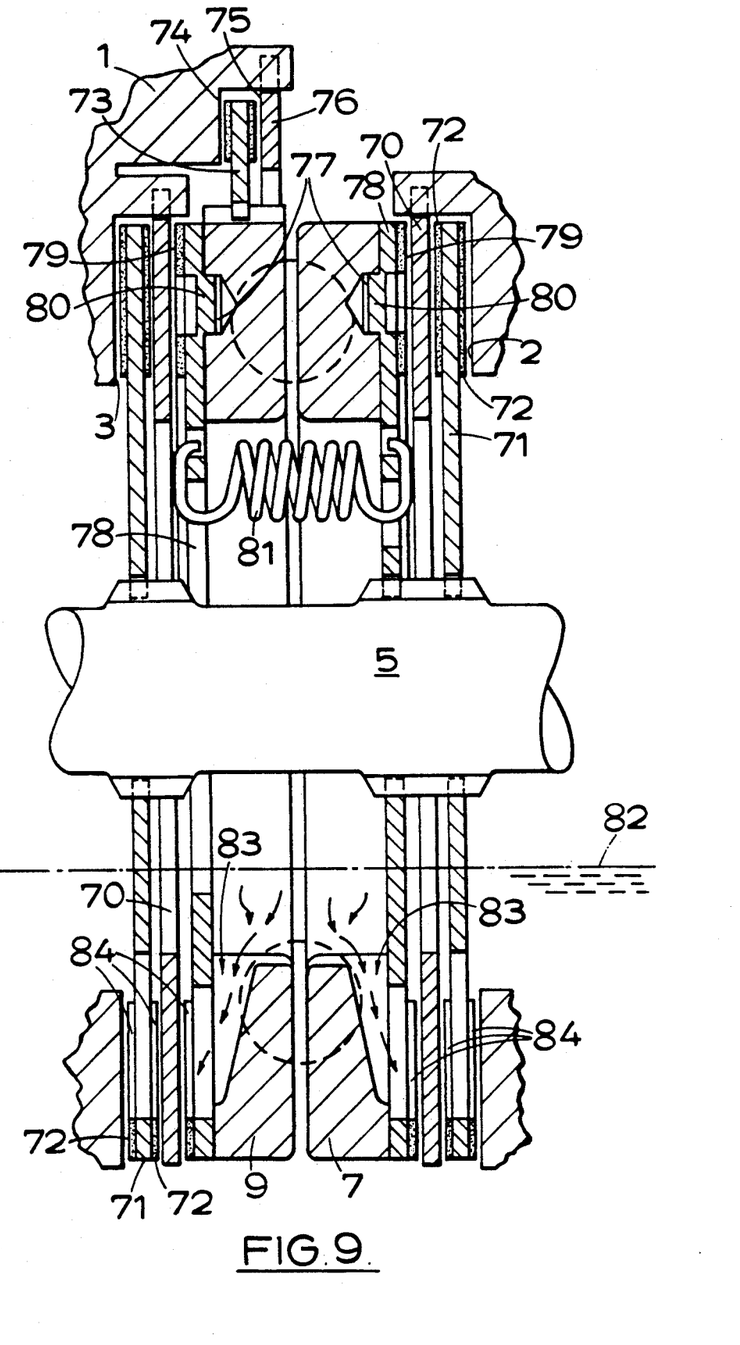
FIG. 9 shows an oil-immersed brake assembly in accordance with the invention.

The embodiment of FIG. 9 has relatively stationary plates 70 keyed to the housing 1 and located between each pressure plate and its respective braking surface 2 or 3. A further friction disc 71 with friction linings 72 is interposed between each stationary plate 70 and the respective braking surface 2 or 3. The servo plate 9 has an annular torque-transmitting disc 73 keyed to its outer peripheral edge for engagement with braking surfaces 74 and 75 provided on the housing and an annular, axially slidable, torque-taking plate 76 respectively. The primary braking means (not shown) acts on the plate 76.

The pressure plates 7 and 9 have a series of angularly spaced recesses 77 in their outer surfaces. Lining discs 78 having friction linings 79 are keyed to the pressure plates by a series of corresponding axial projections 80 received in the recesses 77. The projections 80 are made by partially shearing the material of the discs 78. Brake release springs 81 act between the lining discs 78. The lining disc 78 of the driven pressure plate 7 is keyed to the axle shaft 5, and the driven plate 7 is only keyed to the shaft through its lining disc 78. This simplifies the construction of the driven plate.

The brake of FIG. 9 is an oil-immersed brake, the main reservoir of oil being shown at 82. The pressure plates 7 and 9 each have a series of angularly spaced pockets 83 provided at their radially inner regions, and a series of oil circulation slots or grooves 84 is provided in the linings 79 of the lining discs 78 and the further friction discs 71.

As the pressure plates rotate during brake actuation the pockets 83 dip into the reservoir 82 and collect a quantity of cooling oil which is then directed by centrepetal forces to flow from the pocket 83 into the slots or grooves 84 and thence to flow to the friction linings 72 and 79.

Using the pockets 83 to collect a relatively large volume of oil from the reservoir 82 allows the oil to be released from each pocket into the oil circulation grooves over a large proportion of the rotation cycle of the pressure plates by an appropriate selection of the throttling effect of the relatively narrow slots or grooves emanating from the pockets. A prolonged and sustained cooling effect is achieved, in comparison with simply having slots and grooves dipping periodically into the reservoir 82.

We claim:

1. A self-energising disc brake assembly of the compound type comprising a housing, a rotatable shaft to be braked extending into said housing, spaced braking surfaces in said housing, first and second pressure plates located between said braking surfaces and having in adjacent faces thereof complementary oppositely inclined angularly spaced recesses of which edges define ramp surfaces, and camming means between said plates, said camming means comprising rolling bodies located in complementary pairs of said recesses, relative angular movement between the plates causing said plates to move axially apart and into engagement with said braking surfaces due to said rolling bodies riding said ramps, wherein said first plate comprises a driven plate having an outer peripheral edge, means coupling said driven plate to said rotatable shaft so that said plate is axially movable with respect to said shaft but angularly immovable relative thereto, and said second plate comprises an input plate carried from said driven plate by means of said camming means, said compound brake also comprising primary braking means provided in said housing to retard rotation of said input plate, and a secondary brake formed by said self-energising engagement of said pressure plates with said braking surfaces, actuation of said secondary brake being effected by application of said primary braking means to retard said input plate and so cause relative angular movement between said pressure plates, in turn causing said pressure plates to engage said braking surfaces whereby to initiate a self-energising braking action by said secondary brake, and wherein said input plate has an outer peripheral edge, and torque-transmitting means co-operates with said input plate, said torque-transmitting means comprising at least one annular ring extending radially outwards beyond said outer peripheral edge of said driven plate and having a radial friction surface beyond the said edge, and keying means keying said ring to said outer peripheral edge of said input plate for axial movement relative thereto, said primary braking means being adapted to apply a force to said radial friction surface of said torque-transmitting means substantially in an axial direction in order to retard said input plate.

2. A brake according to claim 1, wherein said primary braking means co-operates with said radial friction surface to constitute a disc brake.

3. A brake according to claim 1, wherein said torque-transmitting means comprises at least two annular rings keyed to said input plate, and said primary braking means includes at least one stationary member interposed between an adjacent pair of said rings and against which said rings are adapted to be urged to brake said input plate.

4. A brake according to claim 3, wherein each said ring has a lining of friction material.

5. A brake according to claim 1, wherein said primary braking means is of a non-servo nature.

6. A brake according to claim 1, wherein said primary braking means comprises a 'spot' type actuator.

7. A brake according to claim 1, wherein said primary braking means comprises an annular piston.

8. A brake according to claim 7, wherein said housing has an annular bore, said annular piston works in said annular bore and defines a pressure space in combination with said bore, and a supply passage is provided through which hydraulic fluid is fed to said pressure space.

9. A brake according to claim 8, including a spacer unit, and securing means for securing said unit to said housing, wherein said annular bore and said supply passage are provided in said spacer unit.

10. A brake according to claim 9, wherein said spacer unit has a radial flange which is clamped against said housing, said supply passage comprises a radially extending passage in said radial flange, and said spacer unit defines a braking surface.

11. A brake according to claim 1, wherein said brake assembly includes a parking brake.

12. A brake according to claim 1, wherein said pressure plates have linings of friction material.

13. A brake according to claim 1, wherein said secondary includes at least one friction disc which is keyed to said shaft and is provided with friction linings interposed between said pressure plates and said braking surfaces on said housing, and stationary plates are interposed between said pressure plates and said friction discs.

14. A brake according to claim 1, wherein said brake assembly is "oil-immersed", and said pressure plates each have at least one pocket adapted to be immersed in a bath of oil.

15. A brake according to claim 14, wherein slots or grooves are provided in said friction linings associated with said pressure plates to encourage the flow of oil.

16. A self-energising disc brake assembly of the compound type comprising a housing a rotatable shaft to be braked extending into said housing, spaced braking surfaces in said housing, first and second pressure plates located between said braking surfaces and having in adjacent faces thereof complementary oppositely inclined angularly spaced recesses of which edges define ramp surfaces, and camming means between said plates, said camming means comprising rolling bodies located in complementary pairs of said recesses, relative angular movement between the plates causing said plates to move axially apart and into engagement with said braking surfaces due to said rolling bodies riding said ramps, wherein said first plate comprises a driven plate having an outer peripheral edge, means coupling said driven plate to said rotatable shaft so that said plate is axially movable with respect to said shaft but angularly immovable relative thereto, and said second plate comprises an input plate carried from said driven plate by means of said camming means, said compound brake also comprising primary braking means provided in said housing to retard rotation of said input plate, and a secondary brake formed by said self-energising engagement of said pressure plates with said braking surfaces, actuation of said secondary brake being effected by application of said primary braking means to retard said input plate and so cause relative angular movement between said pressure plates, in turn causing said pressure plates to engage said braking surfaces whereby to initiate a self-energising braking action by said secondary brake, and wherein torque-transmitting means cooperates with said input plate and is angularly rigid with respect to said input plate, said torque-transmitting means extending radially outwards beyond said outer peripheral edge of said driven plate and having a radial friction surface beyond the said edge, said primary braking means being adapted to apply a force to said radial friction surface of said torquetransmitting means, and means incorporated in said primary braking means to apply said force to said radial friction surface only in an axial direction without a self-energising effect in order to retard said input brake.

* * * * *